(12) United States Patent
Hardy et al.

(10) Patent No.: US 8,032,928 B2
(45) Date of Patent: *Oct. 4, 2011

(54) METHODS, DEVICES, AND COMPUTER PROGRAM PRODUCTS FOR CONTROLLING WIRELESS CONNECTION ACCESS

(75) Inventors: Michael Hardy, Lawrenceville, GA (US); Eric Aslaken, Atlanta, GA (US); Richard Voyentzie, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 799 days.

This patent is subject to a terminal disclaimer.

(21) Appl. No.: 11/829,624

(22) Filed: Jul. 27, 2007

(65) Prior Publication Data

US 2008/0086761 A1    Apr. 10, 2008

Related U.S. Application Data

(63) Continuation-in-part of application No. 11/653,550, filed on Jan. 16, 2007, now Pat. No. 7,664,851.

(60) Provisional application No. 60/830,812, filed on Jul. 14, 2006.

(51) Int. Cl.
G06F 7/04 (2006.01)
G06F 15/16 (2006.01)
G06F 17/30 (2006.01)
G06F 15/173 (2006.01)
G06F 21/00 (2006.01)
H04L 29/06 (2006.01)
H04N 7/16 (2011.01)
H04H 20/71 (2008.01)

(52) U.S. Cl. ........... 726/4; 726/27; 709/224; 709/225; 705/52; 455/3.01

(58) Field of Classification Search ............ 705/52; 726/27, 30, 3–4
See application file for complete search history.

(56) References Cited

U.S. PATENT DOCUMENTS

| | | | | |
|---|---|---|---|---|
| 5,654,746 A * | 8/1997 | McMullan et al. | ............. | 725/29 |
| 5,889,935 A * | 3/1999 | Ofek et al. | ......... | 714/6 |
| 6,108,786 A * | 8/2000 | Knowlson | ........ | 726/11 |
| 6,377,548 B1 * | 4/2002 | Chuah | ............ | 370/233 |
| 6,658,469 B1 * | 12/2003 | Massa et al. | .......... | 709/224 |
| 6,986,133 B2 * | 1/2006 | O'Brien et al. | ............... | 717/173 |
| 7,130,612 B1 * | 10/2006 | Blewett et al. | .............. | 455/406 |
| 7,221,945 B2 * | 5/2007 | Milford et al. | ............ | 455/452.1 |
| 7,296,099 B2 * | 11/2007 | Davison | .......... | 710/15 |
| 7,353,533 B2 * | 4/2008 | Wright et al. | ...................... | 726/1 |
| 7,441,269 B2 * | 10/2008 | Jones et al. | .................... | 726/14 |
| 7,443,867 B2 * | 10/2008 | El-Beik et al. | ............... | 370/401 |
| 7,478,420 B2 * | 1/2009 | Wright et al. | ..................... | 726/1 |
| 7,526,800 B2 * | 4/2009 | Wright et al. | ................... | 726/11 |
| 7,613,445 B1 * | 11/2009 | Stanev | .......... | 455/407 |
| 7,636,936 B2 * | 12/2009 | Wright et al. | ..................... | 726/1 |

(Continued)

*Primary Examiner* — Nathan Flynn
*Assistant Examiner* — Carolyn B Kosowski
(74) *Attorney, Agent, or Firm* — Cantor Colburn LLP (57) ABSTRACT

Methods, devices, and computer program products for controlling wireless network connection access are described. The device includes a processor for executing instructions, and multiple network adapters for operatively connecting to multiple networks. The device includes a wireless network connection monitoring application for controlling access to the multiple networks via the processor, and the monitoring application is configured to monitor the multiple network adapters. The device also includes a monitor file that has permissions for services to communicate on the multiple networks, and the monitoring application allows or denies access to the multiple networks via the plurality of network adapters based on the permissions for the services in the monitor file.

20 Claims, 6 Drawing Sheets

U.S. PATENT DOCUMENTS

| | | | |
|---|---|---|---|
| 7,664,851 B2 * | 2/2010 | Hardy et al. | 709/224 |
| 2004/0123153 A1 * | 6/2004 | Wright et al. | 713/201 |
| 2005/0055578 A1 * | 3/2005 | Wright et al. | 713/201 |
| 2005/0089054 A1 | 4/2005 | Ciancaglini et al. | |
| 2005/0228981 A1 * | 10/2005 | Gavrilov et al. | 713/100 |
| 2005/0278565 A1 | 12/2005 | Frattura et al. | |
| 2006/0036847 A1 * | 2/2006 | Bush et al. | 713/153 |
| 2006/0075124 A1 * | 4/2006 | Dougherty et al. | 709/228 |
| 2006/0094400 A1 * | 5/2006 | Beachem et al. | 455/410 |
| 2006/0120526 A1 * | 6/2006 | Boucher et al. | 380/247 |
| 2007/0100886 A1 * | 5/2007 | Steeb et al. | 707/104.1 |
| 2007/0143851 A1 * | 6/2007 | Nicodemus et al. | 726/25 |
| 2007/0162595 A1 | 7/2007 | Samprathi | |
| 2007/0220252 A1 * | 9/2007 | Sinko | 713/168 |
| 2007/0250910 A1 * | 10/2007 | Miller et al. | 726/4 |
| 2008/0046965 A1 * | 2/2008 | Wright et al. | 726/1 |
| 2008/0052395 A1 * | 2/2008 | Wright et al. | 709/224 |
| 2008/0077971 A1 * | 3/2008 | Wright et al. | 726/1 |
| 2008/0109679 A1 * | 5/2008 | Wright et al. | 714/37 |
| 2008/0153422 A1 * | 6/2008 | Gilbertas et al. | 455/67.11 |
| 2009/0054039 A1 * | 2/2009 | van Wijk et al. | 455/412.1 |
| 2009/0054040 A1 * | 2/2009 | van Wijk et al. | 455/412.1 |
| 2009/0067441 A1 * | 3/2009 | Ansari et al. | 370/401 |
| 2009/0305680 A1 * | 12/2009 | Swift et al. | 455/414.1 |

* cited by examiner

FIG. 2

Services

☐ Sony Ericsson Wireless WAN Adapter

☑ Wired LAN Adapter

MS SMS Agent Host

Select connections to be enabled for each service

FIG. 3

Example:

```
<?xml version="1.0"?>
<MonitorTool DataVersion="9.7.2005">
<NetworkAdapter>
    <Adapter ProductName="Sony Ericsson Wireless WAN Adapter">
        <Application ApplicationID="SMS"
            ApplicationProcess="CcmExec" />
    </Adapter>
</NetworkAdapter>
</MonitorTool>
```

METHODS, DEVICES, AND COMPUTER PROGRAM PRODUCTS FOR CONTROLLING WIRELESS CONNECTION ACCESS

CROSS-REFERENCE TO RELATED APPLICATIONS

This application is a continuation-in-part of non-provisional application 11/653,550 filed Jan. 16, 2007, now U.S. Pat. No. 7,664,851, which claims the benefit of provisional patent application 60/830,812 filed Jul. 14, 2006, the entire contents of both applications are incorporated herein by reference.

BACKGROUND

Exemplary embodiments relate generally to controlling wireless network connection access and, more particularly, to methods, systems, and computer program products for controlling wireless network connection access in response to services attempting to access the wireless network connection.

There exist wireless networks mat charge users on a per byte basis. As "pay by the byte" wireless solutions become more prevalent and device management needs continue to grow (meaning bandwidth requirements will also grow), the ability to discriminate services that are required to run over given connection will be a growing need as well. There is a need in the art for a technique for controlling which services access wireless connections in order to reduce charges incurred on, for example, a pay-per-byte connection.

SUMMARY

Exemplary embodiments include a device for controlling wireless network connection access. The device includes a processor for executing instructions, and multiple network adapters for operatively connecting to multiple networks. The device includes a wireless network connection monitoring application for controlling access to the multiple networks via the processor, and the monitoring application is configured to monitor the multiple network adapters. The device also includes a monitor file that has permissions for services to communicate on the multiple networks, and the monitoring application allows or denies access to the multiple networks via the plurality of network adapters based on the permissions for the services in the monitor file.

Additional exemplary embodiments include a method for controlling wireless network connection access. The method includes initiating a wireless network, connection monitoring application for controlling access to multiple networks, where the monitoring application is configured to monitor multiple network adapters for operatively connecting to the multiple networks. The method includes a monitor file that receives permissions for services to communicate on the plurality of networks, and the monitoring application allows or denies access to the multiple networks via the multiple network adapters based on the permissions for the services in the monitor file.

Further exemplary embodiments include a computer program product, tangibly embodied on a computer readable medium, for controlling wireless network connection access, and the computer program product includes instructions for causing a processor to execute a method. The computer program product includes instructions for causing a computer to execute initiating a wireless network connection monitoring application for controlling access to a plurality of networks, where the monitoring application is configured to monitor multiple network adapters for operatively connecting to the multiple networks. Also, the computer program product includes instructions for causing a computer to execute receiving, by a monitor file, permissions for services to communicate on the plurality of networks, and allowing or denying access, by the monitoring application, to the multiple networks via the multiple network adapters based on the permissions for the services in the monitor file.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
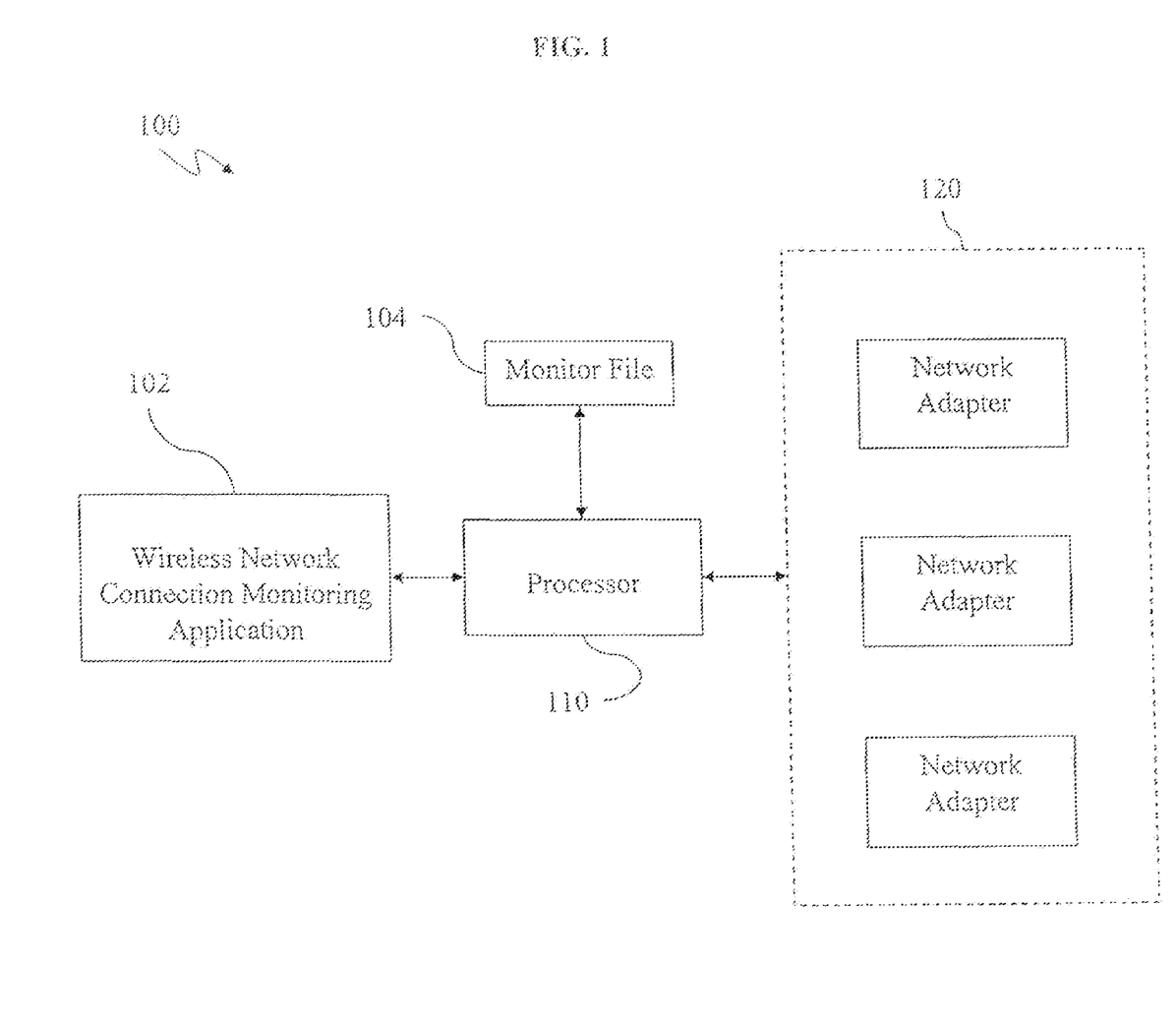
FIG. 1 illustrates a system for controlling wireless network connection access in exemplary embodiments.

FIG. 1 is a block diagram of a system for controlling wireless network connection access in exemplary embodiments. The system may be implemented, on a wireless device (e.g., general purpose computer) 100 which includes a processor 110 executing computer program code stored on a storage medium in order to perform the processes described herein. It is understood that other processor-based devices (e.g., personal digital assistants, wireless phones) may implement the exemplary processes described herein. Thus, exemplary embodiments of the invention are not limited to personal computers.

As known in the art, the wireless device 100 establishes a wireless connection with various networks using known protocols (e.g., 802.11). There are situations, however, where a user does not desire to incur wireless network charges for certain services. For example, it would be desirable for an automatic update from MICROSOFT WINDOWS to be delivered over a less costly, wired network connection, rather than a wireless connection that incurs charges for units of use (e.g., pay-per-byte). Exemplary embodiments allow the user to designate which services have access to the wireless connection.

The device 100 executes a wireless network connection monitoring application 102. According to exemplary embodiments, the wireless network connection monitoring application 102 is initiated, upon booting of the device 100 and accesses a monitor file 104. The monitor file 104 may include a designation of services executing on the device 100 and the network permissions for each service. The monitor file 104 may be generated based on user input as described in further detail herein.

The device 100 also includes network adapters 120 for making network connections. The wireless network connection monitoring application 102 monitors the network adapters 120 and checks for connections and disconnections, according to exemplary embodiments. The wireless network connection monitoring application 102 enables services to execute or disables services from executing on connections established via the network adapters 120, based on network permissions for each service in the monitor file 104.

Figure 2:
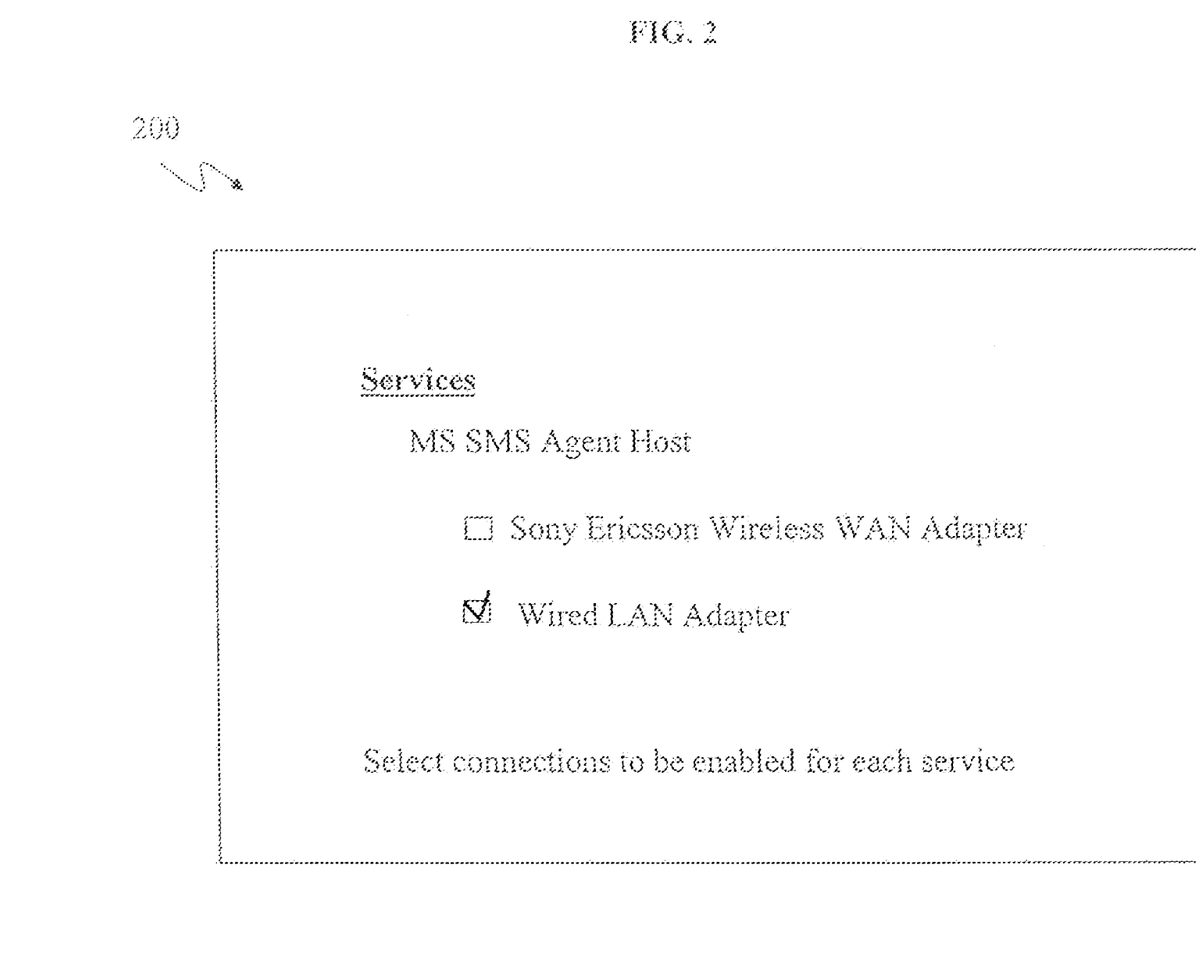
FIG. 2 illustrates an exemplary user interface for controlling wireless network connection access in exemplary embodiments.

FIG. 2 illustrates an exemplary user interface 200 for assigning network permissions to services executing on the device 100. As shown in FIG. 2, the user is presented with a list of services and a list of available network connections of the user interface 200. The user may enable access to network connections on a service-by-service basis by selecting authorized network connections for each service. In the example shown in FIG. 2, the user has authorized the MICROSOFT (MS) systems management server (SMS) Agent Host to communicate on a wired LAN connection but not on a wireless WAN network connection. This prevents the service from communicating on the wireless WAN network connection thereby preventing the occurrence of wireless network charges.

Figure 3:
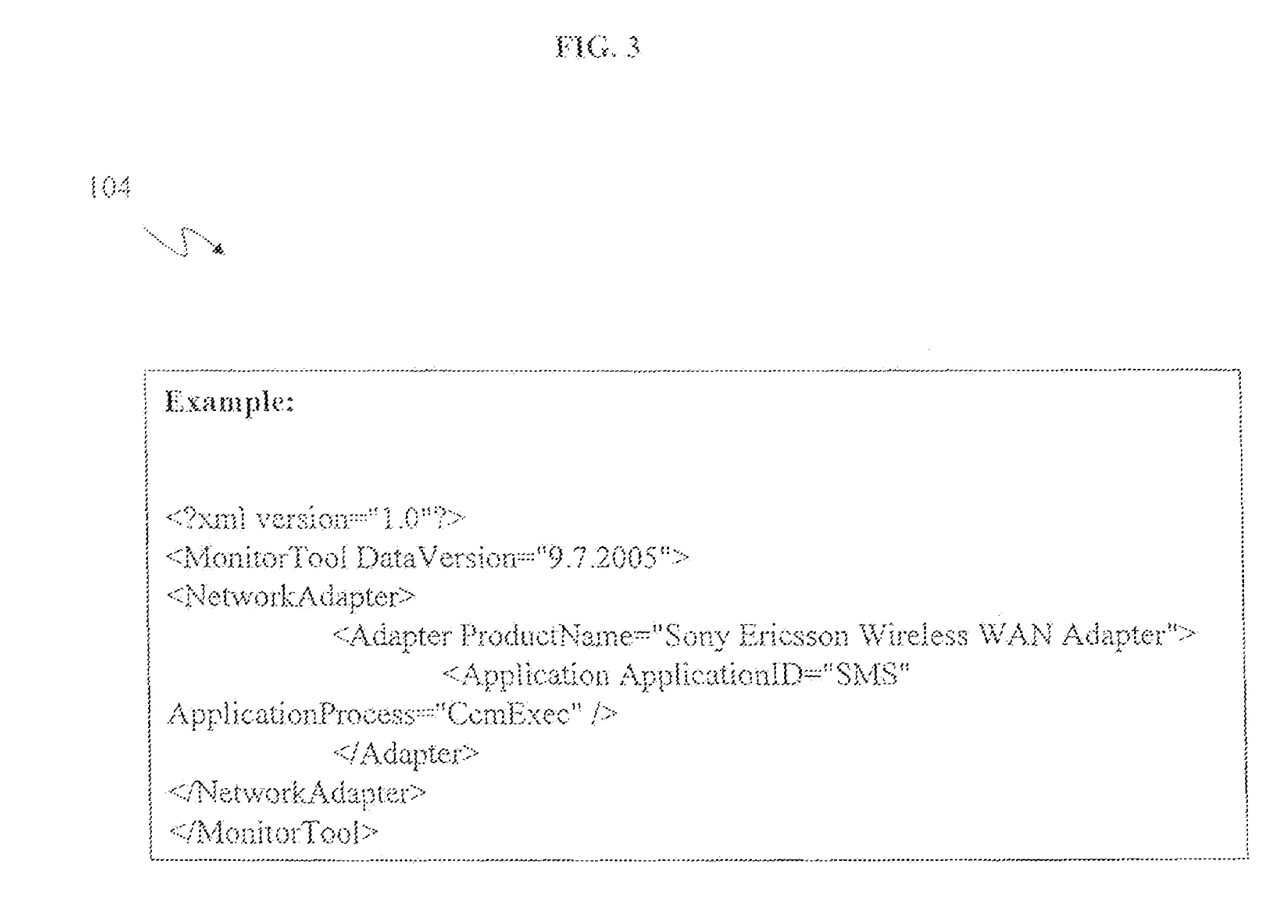
FIG. 3 illustrates an exemplary file generated based on the user input to the user interface of FIG. 2.

Based on the user input in the user interface 200 of FIG. 2, the wireless network connection monitoring application 102 generates the monitor file 104. FIG. 3 depicts an exemplary embodiment of the monitor file 104 generated in XML format. It is understood that the monitor file 104 may be in a variety of formats, and embodiments of the invention are not limited to XML. The monitor file 104 identifies services and the network connections that each service is permitted to access. According to exemplary embodiments, one element of the monitor file 104 is the name of the network adapter that will trigger connectivity events. Another element of the monitor file 104 may be the name of the services that will be stopped and started based on the connectivity event. In exemplary embodiments, the monitor file 104 is accessed by the wireless network connection monitoring application 102 to control access to network connections in response to the information in the monitor file 104.

Figure 4:
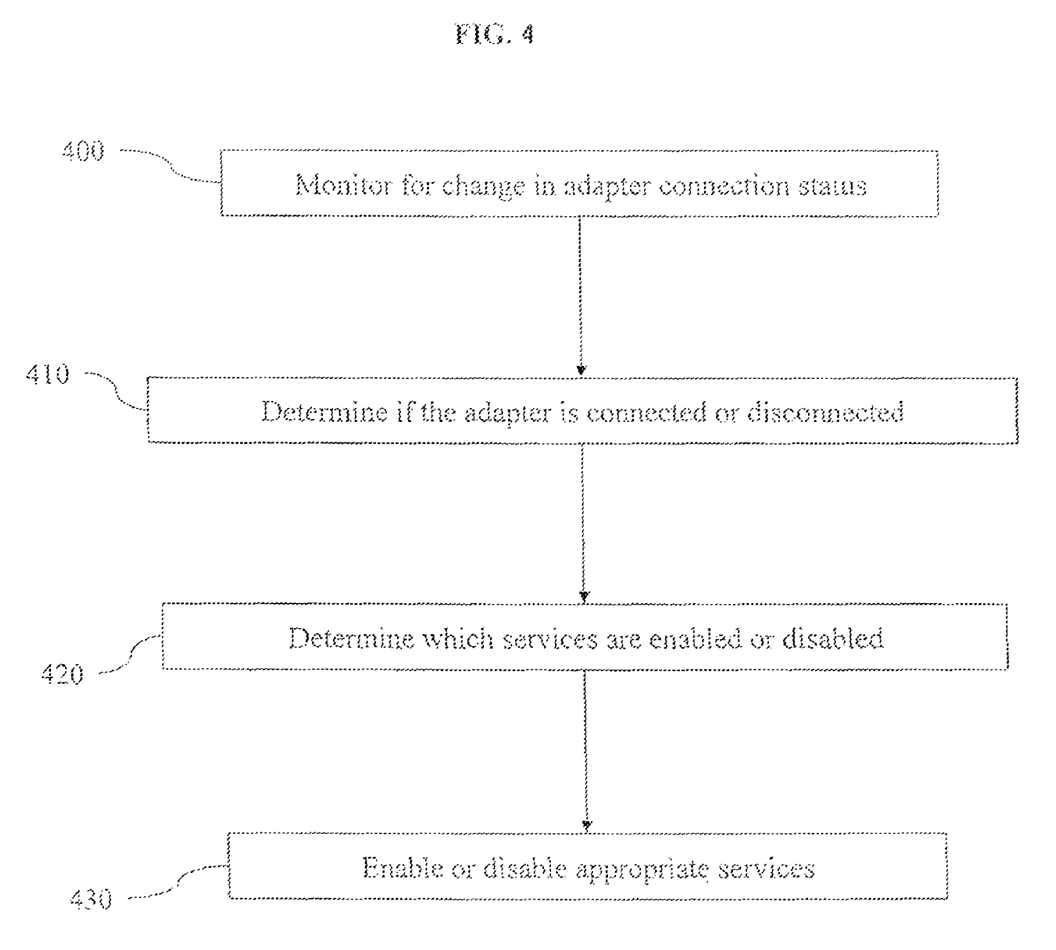
FIG. 4 is a flowchart of a process for controlling services for network connections in exemplary embodiments.

Referring to FIG. 4, operation of the wireless network connection monitoring application 102 is described in accordance with exemplary embodiments. The wireless network connection monitoring application 102 monitors the network adapters 120 associated with the network connections identified in the monitor file 104 at 400, and determines whether network connections have been connected or disconnected at 410. If the wireless network connection monitoring application 102 detects that a certain network adapter (e.g., network adapters 120) has been initiated, the wireless network connection monitoring application 102 determines which services should be enabled or disabled based on the monitor file 104 at 420. For example, when the wireless network connection monitoring application 102 detects the SONY ERICSSON Wireless WAN Adapter (e.g., the network adapters 120) connecting to the wireless network (e.g., at 410), the wireless network connection monitoring application 102 sends a command to disable the MS SMS Agent Most service at 430.

Conversely, if the SONY ERICSSON Wireless WAN Adapter is disconnected from the wireless network, (e.g., at 410), the wireless network connection monitoring application 102 sends a command to enable the MS SMS Agent Host service at 430. Accordingly, appropriate services are enabled or disabled in accordance with the particular network connections in exemplary embodiments.

Exemplary embodiments provide the ability to prevent pre-defined services from being active while pre-defined network adapters are also active in pre-defined combinations. This prevents per-byte wireless network charges from being incurred unnecessarily.

Exemplary embodiments include systems, methods and computer products for network service switching for applications requiring network access that tend to use network bandwidth when not in required use. In general, the ability to prevent pre-defined services from being active while pre-defined network adapters are also active in predefined combinations is provided. As such, if there are several applications that normally require adapter time or network bandwidth, but are not currently in need of required adapter time or network bandwidth, they are blocked from accessing the adapter for unnecessary operations. For example, on a personal computer (PC) certain services do not run when certain conditions exist with associated network adapters.

It is therefore appreciated that issues associated with network connectivity are addressed. Although the embodiments described herein can handle a specific switching scenario, they can also provide a general switching service for multiple applications over a single adapter. In exemplary implementation, a system can determine when a specific adapter has established a network connection, and then turn off services that may communicate across this connection. As such a device can be filtered based on network connection speeds and costs.

Figure 5:
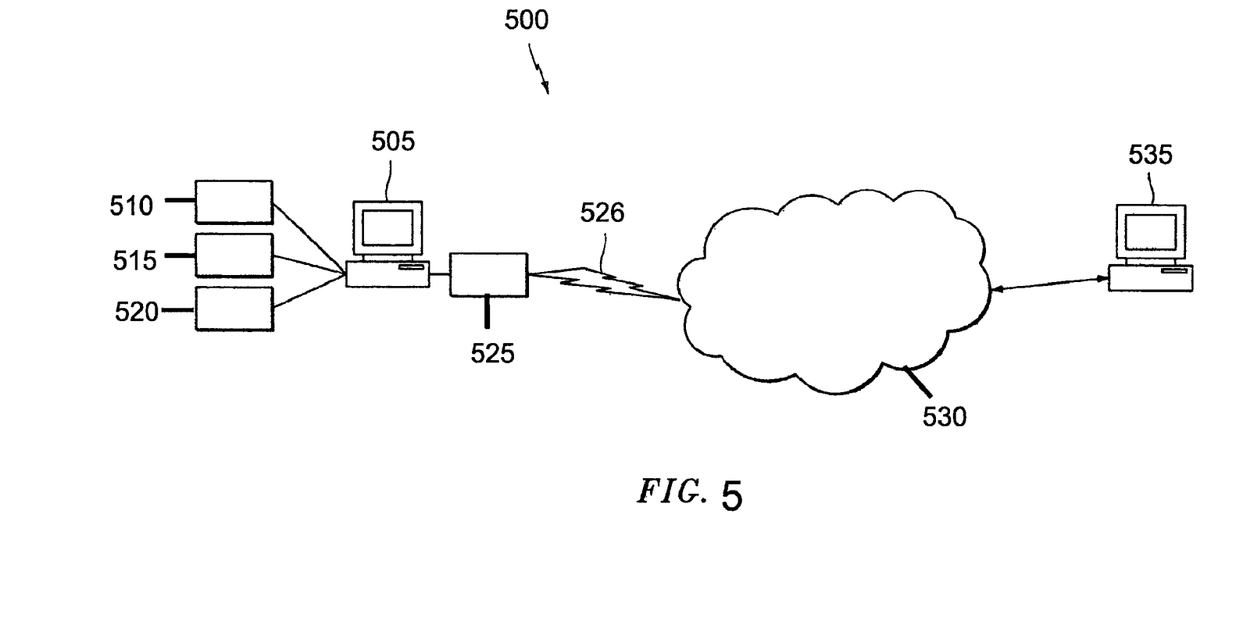
FIG. 5 is a block diagram illustrating a system in which network-switching services may be implemented in accordance with exemplary embodiments.

FIG. 5 is a block diagram illustrating a system 500 in which network-switching services may be implemented in accordance with exemplary embodiments. System 500 can include a network access device 505, which is can be a general purpose computer, which includes a processor executing computer program code stored on a storage medium in order to perform the processes described herein. Network access device 505 can also be any type of network-enabled device that is capable of presenting programming content to viewers. In exemplary embodiments, network access device 505 can be a PC, a laptop computer, a portable computing device (e.g., personal digital assistant), a digital music player (e.g., MP3 player), cellular telephone (e.g., a 3G cell phone), etc. Network access device 505 further can include a network adapter 525 for connectivity to a network 530, via a network connection 526 (i.e., wired or wireless as discussed below). In accordance with exemplary embodiments, network 530 is an IP-based network that transmits content to and from network access device 505 via a broadband connection. In exemplary embodiments, network 530 can be a public network such as the Internet or a managed IP network administered by a service provider, which can control bandwidth and quality of application flow. As discussed, network 530 may be implemented in a wired fashion, e.g. Ethernet, copper, etc, or in a wireless fashion, e.g., using wireless protocols and technologies, such as GPRS, WiFi, WiMax, etc. Although exemplary embodiments of the systems and methods described herein relate to wireless adapters, it is understood that in other exemplary embodiments, wired applications are also contemplated. System 500 can further include an additional network access device 535 in communication with network 530, which can be in further communication with network access device 505.

System 500 further includes applications which can reside in a local memory of network access device 505, a storage medium of network access device 505 or a combination thereof. A first application 510 can be a software application requiring access to network adapter 525. A second application 515 can be a software application also requiring access to network adapter 525. As discussed above, network access device 505 may implement a network access service that requires a "pay by the byte" or "all you can eat" solution. Applications 510, 515 may periodically access network 530 for various reasons that can create network traffic or "chatter".

"Chatter" can be defined as the network traffic generated in the background by a system service or function. "Background" traffic like this is usually, but not always, the result of a service that polls its service-hosting server(s) for a check-in looking for any additional tasks to perform or can be "background" data between an application and its hosting server. In these cases, this "chatter" is considered non-critical to current end user operations, but may be critical to the long term functioning of that service or application and just needs to occur at a later time.

However, one or both of applications 510, 515 may require legitimate access to network 530 via network adapter 525. Legitimate access refers to an operation in which a user desires to have a given service or function communicate over the network and is willing to pay for the bytes transmitted in the case of a "pay by the byte" service or assume the bandwidth consumption in general. As such, according to exemplary embodiments, a third event-driven network service switching utility ("switching") application 520 monitors network adapter 525 and the traffic that is transmitted via network adapter 525. In accordance with exemplary embodiments, switching application 520 can turn off an application that is not in legitimate use when an application that is in legitimate use is accessing network adapter 525. For example, first application 510 may be an "SMS Agent Host" service that allows a service, such as the Microsoft Systems Management Service, to provide configuration management services and software updates to devices on network 530 such as additional network access device 535. These services are preconfigured and therefore may generate network traffic that is undesired at a particular time, such as when an application that is in legitimate use is accessing the network adapter 525. However, network access is not always required, but the SMS Agent Host may constantly try to access network adapter 525 and therefore generate network traffic across the wireless connection that was paid for by the amount of bytes used, but not required. SMS Agent Host therefore has a predetermined network access that activates when not always required by the user. Second application 515 can be any other application in which the user desired to access network 530, such as a browser. Switching application 520 therefore determines when the predetermined network access by SMS Agent Host is connected and stops the service when not required or desired by the user, such as when the second application 515 is accessing the network adapter 525. When the user is finished with the network connection using second application 515, and disconnects from the network 530, switching application 120 may automatically sense the adapter disconnect and start the preconfigured service of the SMS Agent Host without unnecessarily using the network adapter 525.

According to exemplary embodiments, the switching application 520 is an event driven network service switching utility application that is triggered by network interface specific events, such as the connect or disconnect of a network interface such as wireless adapter 525. In other exemplary embodiments, switching application 520 can check for connect and disconnect events on a periodic basis, based on a timer.

The switching application 520 and related network switching services may be implemented as a single program executing on the network access device 505, or may be separate physical components that interact via, e.g., an application programming interface or other technique.

Figure 6:
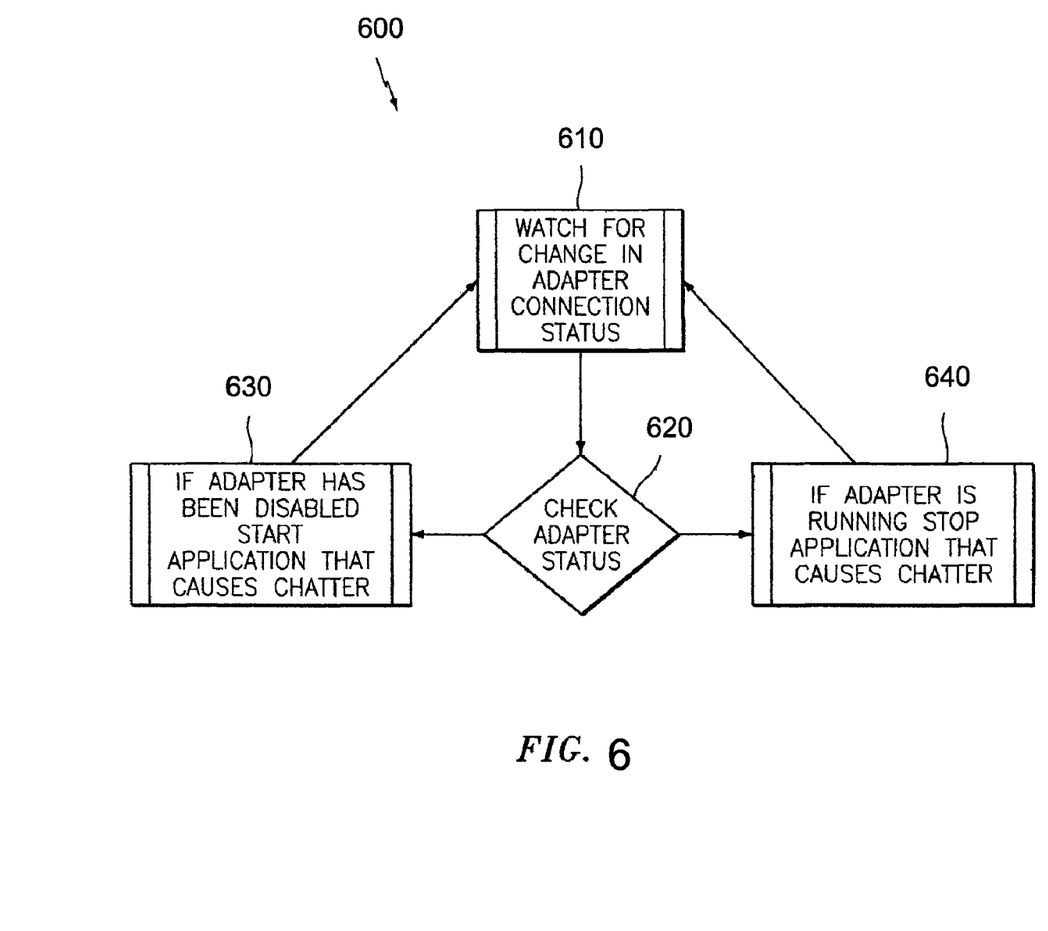
FIG. 6 is a flow diagram describing a process for implementing network switching and monitoring services in exemplary embodiments.

FIG. 6 is a flow diagram describing a process 600 for implementing network switching and monitoring services in exemplary embodiments. In exemplary embodiments, switching application 520 monitors and watches for changes in the network adapter 525 status at step 610. At step 620, switching application 520 checks the network adapter status. If the switching application 520 determines that the network adapter 525 is running and being accessed by an application that would cause undesired chatter on the network adapter 525 and that the undesired application access is not required and/or that an application that a user desires to access the network adapter 525 is accessing the network adapter, the switching application 520 stops the application that would cause undesired chatter at step 640. Similarly, if the network adapter 525 has been disabled (i.e., is not being accessed), the switching application 520 may start the application that would cause undesired chatter on the network adapter 525 at step 630. Process 600 is an ongoing monitoring process via switching application 520 so long as network access device 505 is powered on and using network adapter 525, or until switching application 520 has been disabled.

Further, the examples discussed herein are meant to be non-limiting and to assist in providing a better understanding of the details.

As described heretofore, the exemplary embodiments can he provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include various embodiments. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A user device for controlling wireless network connection access, comprising:
   a processor for executing instructions; and
   a network adapters for operatively connecting to a network;
   the processor operative for:
   establishing a connection with the network via the network adapter;
   generating a first traffic of a first application for communicating over the network adapter in which the first traffic is user initiated, the first application on the device;
   blocking a second traffic of a preconfigured computer service from communicating over the network adapter in response to the first traffic communicating over the network adapter, the second traffic of the preconfigured computer service is not user initiated and the preconfigured computer service is a second application on the device;
   wherein blocking the second traffic of the preconfigured computer service from communicating over the network adapter comprises disabling the preconfigured computer service by a third application in response to establishing the connection with the network via the network adapter; and
   enabling the preconfigured computer service in response to disabling the connection with the network via the network adapter.

2. The device of claim 1, wherein if the third application detects that the network adapter is initiated, the third application determines which of services are enabled or disabled based on a monitor file.

3. The device of claim 1, wherein, in accordance with permissions for services, the third application allows or denies access to corresponding networks.

4. The device of claim 1, wherein a monitor file receives selections from a user, the selections being to a list of services and to a plurality of networks for which a plurality of network adapters may operatively connect, and
   wherein the selections enable the services to communicate on selected networks of the plurality of networks.

5. The device of claim 4, wherein the monitor file is configured to identify the services and corresponding networks of the plurality of networks that each of the services is permitted to access.

6. The device of claim 4, wherein the monitor file comprises the names of the plurality of adapters.

7. The device of claim 4, wherein the monitor file comprises the names of the services.

8. The device of claim 4, wherein the third application allows services to communicate over the plurality of networks based on whether wireless network charges apply.

9. A method for controlling wireless network connection access of a device comprising:
   establishing a connection with a network via a network adapter;
   generating a first traffic of a first application for communicating over the network adapter in which the first traffic is user initiated, the first application on the device;
   blocking a second traffic of a preconfigured computer service from communicating over the network adapter in response to the first traffic communicating over the network adapter, the second traffic of the preconfigured computer service is not user initiated and the preconfigured computer service is a second application on the device;
   wherein blocking the second traffic of the preconfigured computer service from communicating over the network adapter comprises disabling the preconfigured computer service by a third application in response to establishing the connection with the network via the network adapter; and
   enabling the preconfigured computer service in response to disabling the connection with the network via the network adapter.

10. The method of claim 9, wherein if the third application detects that any of a plurality of network adapters are activated, the third application determines which services are enabled or disabled based on a monitor file.

11. The method of claim 9, further comprising receiving selections, from a user, to a list of services and to a plurality of networks for which a plurality of network adapters may operatively connect, wherein the selections enable the services to communicate on selected networks of the plurality of networks.

12. The method of claim 11, wherein a monitor file is configured to identify the services and corresponding networks of the plurality of networks that each of the services is permitted to access.

13. The method of claim 12, wherein the monitor file comprises the names of the plurality of network adapters.

14. The method of claim 12, wherein the monitor file comprises the names of the services.

15. The method of claim 9, wherein the third application allows the services to communicate over the plurality of networks based on whether wireless network charges apply.

16. A computer program product, tangibly embodied on a non-transitory computer readable medium, for controlling wireless network connection access, the computer program product including instructions for causing a processor of a computer to execute a method, comprising:
   establishing a connection with a network via a network adapter;
   generating a first traffic of a first application for communicating over the network adapter in which the first traffic is user initiated, the first application on the computer;
   blocking a second traffic of a preconfigured computer service from communicating over the network adapter in response to the first traffic communicating over the network adapter, the second traffic of the preconfigured computer service is not user initiated and the preconfigured computer service is a second application on the computer;
   wherein blocking the second traffic of the preconfigured computer service from communicating over the network adapter comprises disabling the preconfigured computer service by a third application in response to establishing the connection with the network via the network adapter; and
   enabling the preconfigured computer service in response to disabling the connection with the network via the network adapter.

17. The computer program product of claim 16, wherein if the third application detects that any of a plurality of network adapters are activated, the third application determines which of the services are enabled or disabled based on a monitor file.

18. The computer program product of claim 16, further comprising instructions for causing the computer to execute receiving selections, from a user, to a list of services and to a plurality of networks for which a plurality of network adapters may operatively connect, wherein the selections enable the services to communicate on selected networks of the plurality of networks.

19. The computer program product of claim 18, wherein the monitor file is configured to identify the services and corresponding networks of the plurality of networks that each of the services is permitted to access, and wherein the monitor files comprises at least one of the names of the plurality of adapters and the names of the services.

20. The computer program product of claim 18, wherein the third application allows services to communicate over the plurality of networks based on whether wireless network charges apply.

* * * * *